United States Patent [19]

Shuh

[11] Patent Number: 4,495,616

[45] Date of Patent: Jan. 22, 1985

[54] PCM CONFERENCE CIRCUIT

[75] Inventor: Bruce D. Shuh, Guelph, Canada

[73] Assignee: International Standard Electric Corporation, New York, N.Y.

[21] Appl. No.: 427,970

[22] Filed: Sep. 29, 1982

[51] Int. Cl.³ .......................................... H04Q 11/04
[52] U.S. Cl. .................................. 370/62; 179/18 BC
[58] Field of Search ...................... 370/62; 179/18 BC

[56] References Cited

U.S. PATENT DOCUMENTS

| | | | |
|---|---|---|---|
| 3,699,264 | 10/1972 | Pitroda et al. | 179/18 BC |
| 3,958,084 | 5/1976 | Nicholas | 179/18 BC |
| 4,007,338 | 2/1977 | McLaughlin | 179/18 BC |
| 4,031,328 | 4/1977 | Pitroda | 179/18 BC |
| 4,388,717 | 6/1983 | Burke | 370/62 |

Primary Examiner—Douglas W. Olms
Assistant Examiner—Frank M. Scutch, III
Attorney, Agent, or Firm—John T. O'Halloran; Alfred C. Hill

[57] ABSTRACT

A conference circuit for controlling one or more conferences within a digital time division telecommunications system. The conference circuit uses the generally known loudest speaker approach. Within the circuit, the address and loudness level of the loudest speaker for each conference in progress in the system during each time division frame is stored in memory. If the loudness level of a conference is not exceeded during a succession of frames, the level is allowed to decay by a percentage of the loudness indication stored at the end of that succession.

2 Claims, 3 Drawing Figures

PCM CONFERENCE CIRCUIT

BACKGROUND OF THE INVENTION

Conference circuits for digital systems are well-known in the art. Essentially such conferences use techniques similar to either the summing technique shown by such U.S. Pat. Nos. 3,761,624 issued Sept. 25, 1973 and 3,796,833 issued Mar. 12, 1974 both to Lewis et al., or to the loudest speaker technique as shown by U.S. Pat. No. 3,699,264 to S. Pitroda et al.

Using the loudest speaker approach, a number of variations and improvements have been developed such as the reference level decay of U.S. Pat. No. 3,958,084 to Nicholas issued May 18, 1976.

SUMMARY OF THE INVENTION

The present invention is directed to a conference circuit of the type shown by Canadian Patent Application Ser. No. 351,491 filed May 8, 1980 of Y. Parmar et al, and adapted for use in a digital telecommunications system of the type shown by Canadian patent applications Ser. No. 332,385 filed July 23, 1979 and 351,492 filed May 8, 1980 both to F. Ahmed.

The conferencing circuit noted above stores data from each time slot of the system and compares the most significant bits of data from conferencing time slots against stored data representing the loudest speaker in each conference.

The present invention adds to that circuit the threshold or speaker decay feature. By the use of this feature, the stored loudest speaker data is altered after a plurality of time frames to reduced the stored speaker's level. If no speech higher than that level occurs during successive time frames, the stored speaker level is reduced until a floating low level is reached.

By the use of the present circuit, a fast rise, slow descent speech amplitude network is provided.

DETAILED DESCRIPTION

The conference circuit shown by the drawings is designed for use with a digital telephone system of the type shown by Canadian Patent Applications Ser. No. 332,385 filed July 23, 1979 and Ser. No. 351,492 filed May 8, 1980 both to F. Ahmed. In such a system there are a maximum of 144 ports having access to the system. The ports are grouped into groups of up to 24 channels per group. For switching between groups, the channels are multiplexed onto a nine bit parallel, 192 time slot, single channel time division bus. The nine bits include eight data bits and one signalling bit. In this system, analog voice signals are encoded into an eight bit code format.

In the system as shown, up to 24 channel time slots of the 192 available per frame are assigned to conference activity, there being possible up to six conferences with up to four parties per conference. The 24 conference time slots are grouped.

When a conversation is set up between parties, two time slots are assigned to each party, one for receiving and one for transmitting. In a two-party conversation, the receiving time slot of part A is the transmitting time slot of party B and vice versa, and hence a total of two time slots is required. However, in a multi- (three or more) party conversation (a conference), two separate time slots are required for each party and thus the total number of time slots required for a conference is equal two times the number of parties in a conference.

Figure 1:
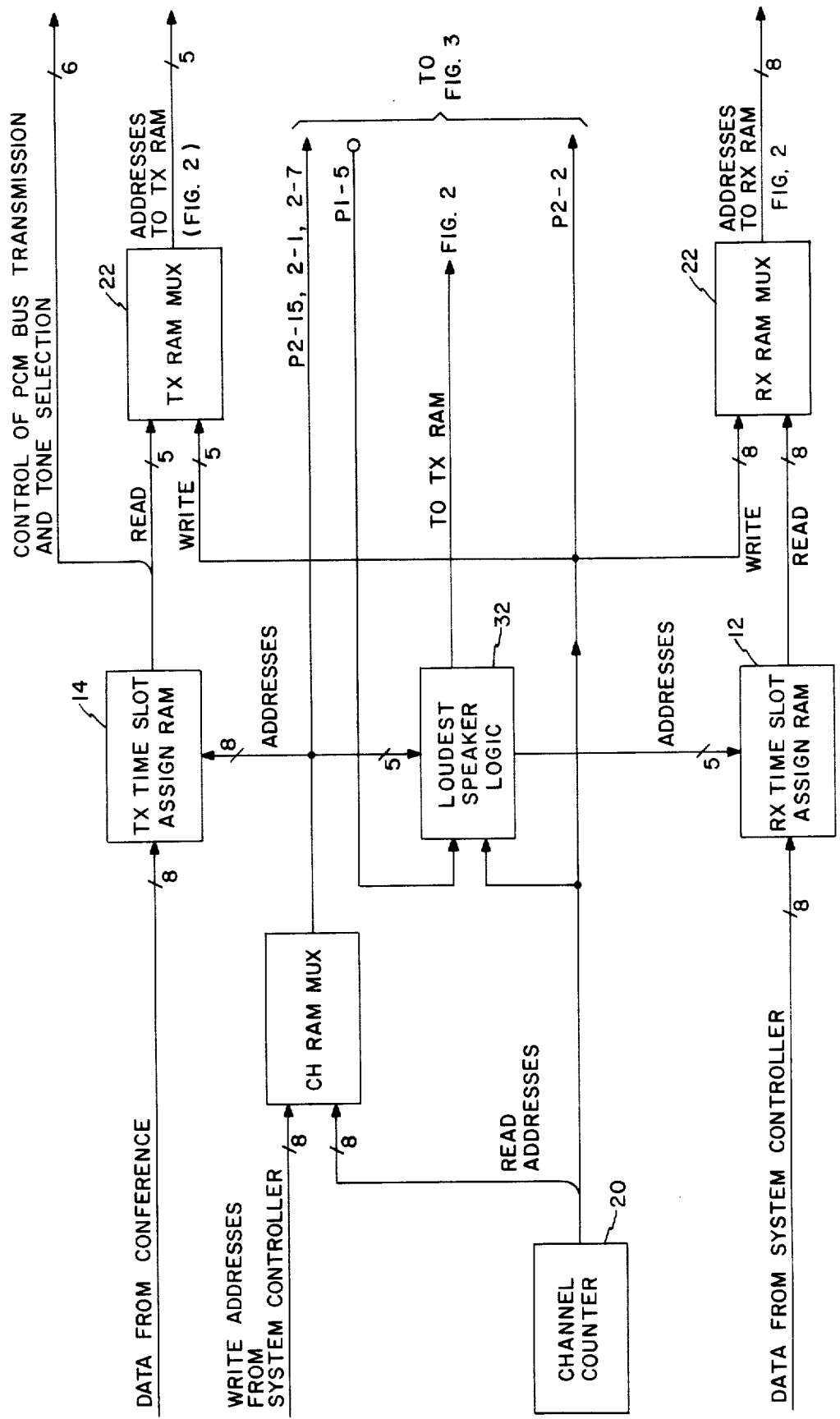
FIG. 1 is a schematic block diagram of the conference control addressing network used with the present invention.

To set up a conference, the system control has to pass to the conference circuit of FIG. 1, the information concerning transmitting and receiving time slot assignments of each party going to the conference circuit. This information is stored in the RX time slot assignment RAM 12 and TX time slot assignment RAM 14 of the conference circuit, respectively. Note that the transmitting time slot assignment information of a party is stored in the RX time slot assignment RAM in the conference circuit, not the TX time slot assignment RAM.

The conference circuit picks up the speech sample words (in PCM encoding format) of each party from the PCM highway every frame at the party's transmitting time slots. It makes comparisons based on the speech sample words and selects the loudest speaker for each conference. The speech sample word of the loudest speaker is then transmitted from the conference circuit to all other parties of that conference at their receiving time slots. A sample word representing a silent period is sent to the loudest speaker of each conference.

The components of the conference circuit as shown are capable of handling up to eight conferences of maximum four parties each at one time, however, only six such conferences are employed in the circuits as disclosed.

Addresses denoting the assignment of specific time slots allocated to parties entering a conference are stored in the RX time slot assignment RAM 12. The RX time slot assignment RAM 12 is divided into eight separate blocks one for each possible conference. Each block contains four storage locations, each location being used to store the time slot address of a conferee included in the block used by that conference.

Speech sample words in eight bit PCM encoded format are written from the PCM highway or bus into the RX RAM 16 (FIG. 2) at locations provided by the time slot of channel counter 20 through the RX RAM multiplexer MUX 22.

There are 192 locations in the RX RAM 16, each of these locations representing a time slot. Sample words of a time slot are stored in the corresponding location and are updated in every frame.

The RX time slot assignment RAM 12 passes the time slot assignment information to the RX RAM 16 through the RX RAM MUX 22. The sample word of the corresponding time slot is then output from the RX RAM 16 to the comparator register 24 and or the comparator 30 in the comparison control circuit of FIG. 3.

Figure 3:
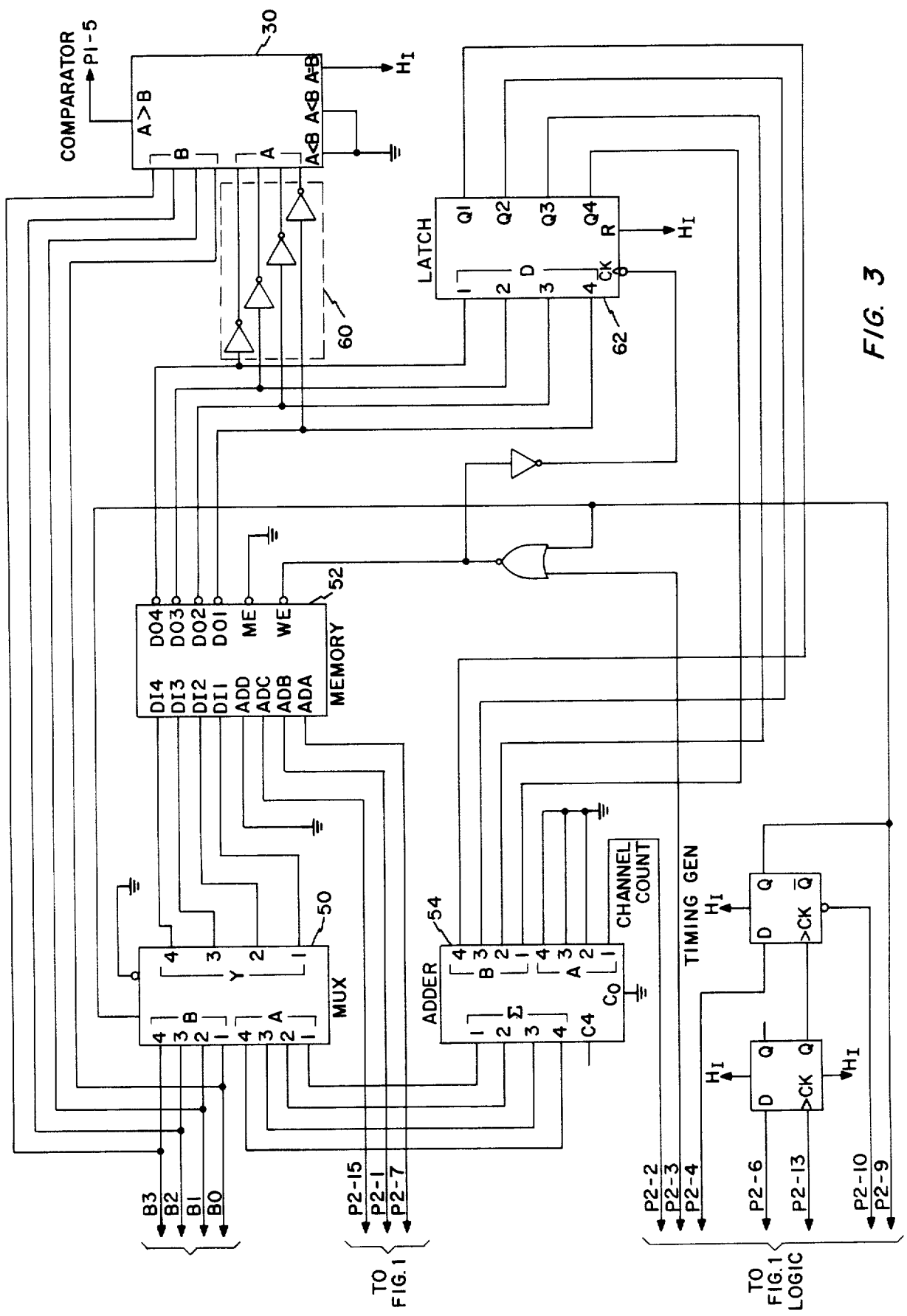
FIG. 3 is more detailed block diagram of the threshold control circuit of FIG. 2.

As soon as a conference is set, the first conferee is assumed to be the loudest speaker. Its sample word is output from the RX RAM 16 and is loaded into the comparator register 24. This sample word is then fed to the input B of the loudest speaker comparator 30 (FIG. 3). The sample word of the second conferee is output from the RX RAM 16 at the second time slot period and is fed to the input A of the louder speaker comparator 30. Only the most significant four bits of each of the sample words are taken to compare. If the comparison shows that the first conferee is a louder speaker, its sample word will remain in the comparator register 24 and the sample word of the second conferee will be ignored. However, if the comparison shows that the second conferee is a louder speaker, the louder speaker comparator 30 will generate a pulse on lead P 1-5 to the loudest speaker logic circuit 32 (FIG. 1) which will then generate a signal to strobe in the sample word of the second conferee from the output of the RX RAM 16 to the comparator register 24.

At the third time slot period the sample word of the third conferee is fed out of the RX RAM 16 and is fed to input B of the louder speaker comparator 30 to compare with the sample word stored in the comparator register 24. Again, if the third conferee is a louder speaker, its sample word will be stored into the comparator register 24, otherwise, it will be ignored.

At the fourth time slot period the sample word of the fourth or the last conferee is compared to the sample word stored in the comparator register 24 in the same fashion as the 2nd and 3rd conferee. Before the sample word of the first conferee of the next conference is loaded into the comparator register 24, the sample word of the loudest speaker of the present conference is loaded into the mask register 38, at the same time, the information of which conferee being the loudest speaker is stored in the TX time slot arrangement RAM 14.

A four time slot period is required to select the loudest speaker of a conference. During the next four time slot period, while the conference circuit is selecting the loudest speaker for the second conference, the sample word of the loudest speaker of the first conference is loaded from the mask register 38 through the mask circuit 36 to the TX RAM 40 at some locations dedicated to the conferee of that conference. The loudest speaker logic circuit 32 provides to the mask circuit 36 the information which conferee is the loudest speaker. The mask circuit 36 upon receiving this information, masks the sample word into a sample word of silent period when it is loaded to the location dedicated to the loudest speaker in the output of TX RAM 40.

When the TX RAM 40 is in its input mode, it receives data (sample words) from the mask circuit 36 and addresses from the time slot or channel 20 counter through the multiplexer 22. When the TX RAM is in its output mode, it receives address information from the TX time slot assignment RAM 14 through MUX 22 and output its contents (sample words) to the output buffer and latch 42 at a time slot requested by the TX time slot assignment RAM 14. The sample words are then output to the PCM highway.

The whole procedure, from collecting sample words of all conferees, selecting the loudest speakers, until outputting the sample words to the PCM highway, is repeated every frame. However, in the next frame, the louder speaker logic circuit will provide its information to the RX time slot assignment RAM 12 so that the loudest speaker of a conference at the present frame will become the FIRST conferee of that conference in the next frame. This is to avoid switching speakers while the comparison of two sample words comes up to be equal.

Figure 2:
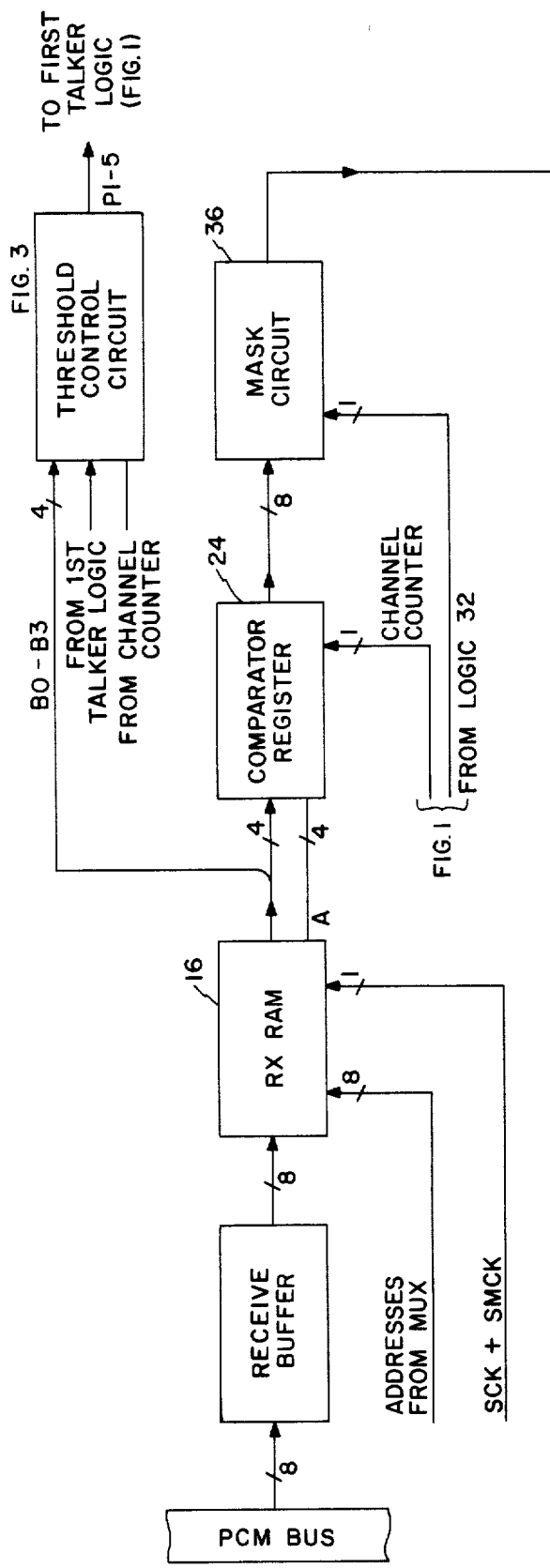
FIG. 2 is a schematic block diagram of the conference data circuit as used herein.
Figure 2:
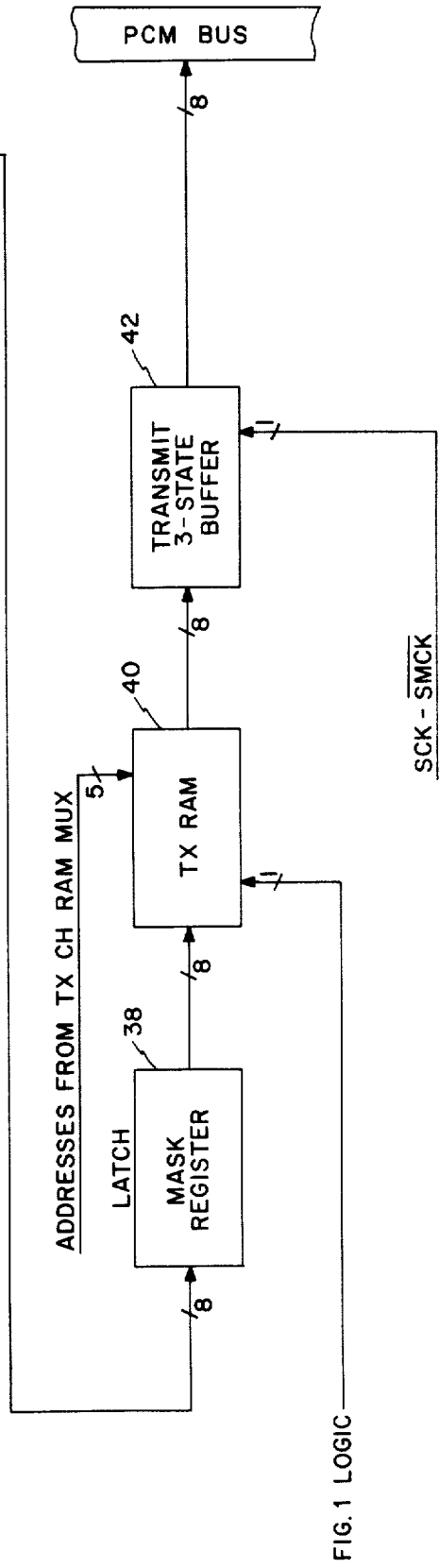

Restated, the conference data circuit of FIGS. 2 and 3 is the path of conference speech from the PCM bus through the loudness comparison circuit and back to the PCM bus for distribution to the conferees. A maximum of six conferences of four conferees can be in effect at any time. The function of the loudness comparison circuit is to select the speech data from one conferee for each conference for transmission on the PCM bus.

The loudness comparison circuit includes the comparator register 24, voice comparator 30 and logic 32. The loudness comparator compares the voice data of all conferees in each conference to determine which of the conferees is loudest.

During each PCM frame period, all 192 PCM data words are loaded into the RX RAM 16 at the addresses corresponding to their respective time slots. Included in these are the data words from 24 possible transmit PCM channels of four conferees in each of six conferences. The conference data words are read out of the RX RAM in successive system clock periods and fed to the loudness comparison circuit.

The data word of the first speaker of a conference, the loudest, is latched into the comparator register 24. The most significant (amplitude) bits, numbers 3, 4, 5, and 6, from the register are applied to the 'A' input of the loudness comparator 30. While this data word remains latched, the corresponding bits of the other three conferees are applied in succession to the B input of the comparator. The comparator decision as to the loudest speaker is used to confirm the assignment of the speaker's next PCM data word to the comparator register or to select one of the other three.

On completion of a comparison, the data word in the comparator register 24 is fed to the mask register 38. The mask is controlled by the loudness comparison logic. The purpose of the mask is to prevent the loudest speaker's voice from reaching his handset. His voice data word is fed only to receive PCM channels of the other conferees but is masked from transmission to his own channel. The data word is stored in the TX RAM 40 at the three addresses assigned to the other parties to the conference. A zero data word is stored in the fourth address. The loudest data word and zero data word are fed by the transmit 3-state buffer 42 at the appropriate time slots to the PCM receive channels assigned to the conferees. The enable command for the buffer is stored at the corresponding location in the TX CH RAM.

The data words of the other conferees stored in the RX RAM follow those of the first conferee to the loudness comparison circuit during successive system clock periods. The process described in the preceding paragraphs is executed for each conference once during each PCM frame period.

The loudest speaker comparison is performed on the four most significant bits of eight bit words representing the speech data. The four most significant bits of a word being compared are transmitted from the RX RAM 16 over the B0-B3 leads to the multiplexer 50 of FIG. 3 and to the B leads of the loudest speaker comparator 30. These words are compared with words received from the inverter memory 52.

The memory 52 is a four bit wide memory with a unique address for each of the conference circuits, as mentioned there being a maximum of six conference circuits. The memory stores data from one PCM frame to the next, a sample comprising most significant bits of the amplitude value of the loudest speaker for each conference. Each frame the sample from the speaker is transmitted on the A leads from the memory 52 to the comparator 30 and compared successively against samples from the other parties to the conference received on the B leads. If the samples from any other party exceed that of the speaker as stored in memory, a signal is sent out on lead P 1-5 to the loudest speaker logic, and the sample from the now-loudest speaker are loaded into the memory 52.

After a predetermined number of frames, on a count of sixteen frames, as determined by the channel counter 20 over lead P 2-2, a signal is sent to adder 54 of FIG. 3. This signal increments the value of the stored sample to effectively decrease the value of the sample to a threshold by negative logic. The decreased value sample becomes a threshold representative of the loudest speaker and provides the value which must be exceeded by another party to become the loudest speaker.

The threshold is allowed to slowly decay if no one exceeds the present threshold. Each frame the present threshold is latched in latch 62 and fed back through adder 54 and multiplexer 50 to be rewritten in the memory. But in one of each 16 frames (once each 2 ms) P 2-2 goes high and this feed back path adds via adder 54 a value of one to the hexadecimal threshold value. This effectively decreases the threshold value by one (negative logic). If there was no voice present this process would continue until a threshold value of F was achieved.

Thus, a floating threshold is generated with a fast rise and slow decay. The decay is performed by successively adding 1 to bits 2-5 (where 1 is the MSB) of the u-law PCM word. Thus, the threshold in the analog realm is following that sort of decay.

In the circuit of FIG. 3, the A outputs of the threshold memory 52 to the 4 bit comparator 30 are inverted through inverter stage 60. These outputs are also transmitted to a recycling quad latch 62 for recycling to the adder 54. This latch provides a stop function to stabilize the memory 52 at the 1 add on rate. The latch stores the threshold sample every frame passing on the sample to the adder for decrementing once every 16 frames.

The comparison in comparator 30, therefore, is between the stored sample which may be decremented and the new sample at its full value. If the new sample is louder, its value is stored and it becomes the speaker transmitted to the other parties to the conference.

During the four time slots for each conference circuit, a unique address resides on the address leads of memory 52. At the end of these four time slots, if a new loudest talker is not found, a pulse is generated on the NOR gate. The leading edge of this pulse clocks the latch 62 which stabilizes the feedback through adder 54 and MUX 50. At the end of this pulse, the data feedback is latched into memory 52 via the above route.

The above sequence can also happen during any one of the four time slots of each conference if a new loudest talker is found. But in both cases, the purpose of latch 62 is to sequence the feedback path and thus allow a stabilizing time period so that output does not race around to input of memory 52.

The timing generator is used to sample the output of comparator 30 signifying a new loudest talker. The sampling is required to allow for setup times of memory 52 before a write pulse from the Q output of the timing generator is created.

What is claimed is:

1. A conference circuit for controlling multiple port conferences within a time division communication system arranged to transmit signals over a highway comprised of plurality of time spaced channels within a series of sequential time frames; said conference circuit including for each conference call in progress: storage means for storing therein multi-bit words with each multi-bit word representing a sample of voice data from one of the parties involved in a conference call, a latch circuit coupled to the output of said storage means to store for each conference at least one word from said storage means representing the sample read from said storage means during the prior frame having the highest amplitude, a comparator coupled to the input of said storage means and said latch circuit for comparing a plurality of bits of said word stored in said latch circuit against a currently read word from each other party to a conference, means coupled to said comparator and said storage means for replacing said word in said latch circuit with said currently read word when said comparison indicates that said currently read word has a higher amplitude than said word against which it was compared, a further means coupled to said latch circuit and the input of said storage means for storing said word indicating the highest amplitude from each conference call, means coupled to said further storage means for timing the duration of storage in said further storing means and for changing said stored word in said latch circuit to indicate a lower amplitude level when said duration of storage exceeds a predetermined plurality of time frames.

2. In a multiple port digital telecommunications system, a conference circuit for controlling a conference using digital time division techniques, said circuit including a multiple bit receive memory for storing a data word from each time slot during each time frame, in which each data word represents a speech sample from a port of said system, latch means for storing a data word from a first party to said conference, a multiple bit comparator, first means coupled to the output of said receive memory for transmitting a code word from said receive memory to said comparator representing the most significant digits of each data word, a further memory coupled to the output of said receive memory and said latch means to receive code words from said receive memory and said latch means, second means for transmitting code words from said further memory to said latch means and said comparator for comparison therein with code words from said receive memory via said first means whereby a code word representing the loudest speech sample is stored in said further memory, and third means coupled between said latch means and said further memory operative a predetermined time intervals to change said code word representing the loudest speech sample to successive code words representing successively less loud speech samples for transmission to said comparator.

* * * * *